US012135046B2

(12) United States Patent
Kang et al.

(10) Patent No.: US 12,135,046 B2
(45) Date of Patent: Nov. 5, 2024

(54) HYDRAULIC MACHINE

(71) Applicant: Volvo Construction Equipment AB, Eskilstuna (SE)

(72) Inventors: Minheuk Kang, Gyeongsangnam-do (KR); Manseuk Jeon, Gyeongsangnam-do (KR)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 0 days.

(21) Appl. No.: 17/926,800

(22) PCT Filed: May 22, 2020

(86) PCT No.: PCT/KR2020/006675
§ 371 (c)(1),
(2) Date: Nov. 21, 2022

(87) PCT Pub. No.: WO2021/235574
PCT Pub. Date: Nov. 25, 2021

(65) Prior Publication Data
US 2023/0193931 A1     Jun. 22, 2023

(51) Int. Cl.
*F15B 13/02* (2006.01)
*F15B 11/044* (2006.01)
*F15B 11/16* (2006.01)

(52) U.S. Cl.
CPC .......... *F15B 13/027* (2013.01); *F15B 11/044* (2013.01); *F15B 11/161* (2013.01);
(Continued)

(58) Field of Classification Search
CPC ....... F15B 11/044; F15B 11/16; F15B 11/161; F15B 13/027; F15B 2211/30505;
(Continued)

(56) References Cited

U.S. PATENT DOCUMENTS 3,817,153 A * 6/1974 Zunzer .................... F15B 1/027
60/405
3,878,864 A    4/1975 Schurger
(Continued)

FOREIGN PATENT DOCUMENTS

CN    205025846 U    2/2016
EP    0331076 A1    9/1989
(Continued)

OTHER PUBLICATIONS

International Search Report and Written Opinion of the International Searching Authority, PCT/KR2020/006675, Feb. 2, 2021, 7 pages.
(Continued)

*Primary Examiner* — Michael Leslie
(74) *Attorney, Agent, or Firm* — Sage Patent Group

(57) ABSTRACT

A hydraulic machine includes an actuator, a tank, a directional control valve disposed between the actuator and the tank, and an adjustable return check valve disposed between the directional control valve and the tank. The directional control valve includes an attachment actuator directional control valve disposed between an attachment actuator of the actuator and the tank and a swing actuator directional control valve disposed between a swing actuator of the actuator and the tank. The adjustable return check valve allows fluid to flow from the attachment actuator directional control valve toward the tank while applying the low back pressure but blocks a flow, and allows fluid to flow from the swing actuator directional control valve toward the tank while applying the high back pressure but blocks a reverse flow.

9 Claims, 3 Drawing Sheets

(52) U.S. Cl.
CPC ............... *F15B 2211/30505* (2013.01); *F15B 2211/3116* (2013.01); *F15B 2211/323* (2013.01); *F15B 2211/329* (2013.01); *F15B 2211/353* (2013.01); *F15B 2211/40515* (2013.01); *F15B 2211/45* (2013.01); *F15B 2211/555* (2013.01); *F15B 2211/6316* (2013.01)

(58) Field of Classification Search
CPC ........ F15B 2211/3055; F15B 2211/353; F15B 2211/45; F15B 2211/46
See application file for complete search history.

(56) References Cited

U.S. PATENT DOCUMENTS

| | | | |
|---|---|---|---|
| 4,779,837 A * | 10/1988 | Mito | F15B 9/10 |
| | | | 251/38 |
| 5,044,256 A | 9/1991 | Budzich | |
| 5,791,142 A | 8/1998 | Layne et al. | |
| 6,241,212 B1 | 6/2001 | Takahaski et al. | |
| 7,162,869 B2 | 1/2007 | Yoshino | |
| 7,174,711 B2 * | 2/2007 | Nanjo | E02F 9/2282 |
| | | | 60/486 |
| 10,041,228 B2 | 8/2018 | Ueda | |
| 10,280,589 B2 * | 5/2019 | Oka | F15B 11/16 |
| 11,268,543 B1 * | 3/2022 | Lee | B30B 15/186 |
| 11,396,950 B2 * | 7/2022 | Harigovindan | F16K 15/026 |
| 2003/0121256 A1 | 7/2003 | Mather | |
| 2013/0318959 A1 * | 12/2013 | Shang | F15B 11/042 |
| | | | 60/459 |

FOREIGN PATENT DOCUMENTS

| | | |
|---|---|---|
| EP | 0704628 B1 | 11/1999 |
| JP | 2005195131 A | 7/2005 |

OTHER PUBLICATIONS

Extended European Search Report, European Patent Application No. 20936942.0, mailed Jan. 2, 2024, 8 pages.

* cited by examiner

[Fig. 1]
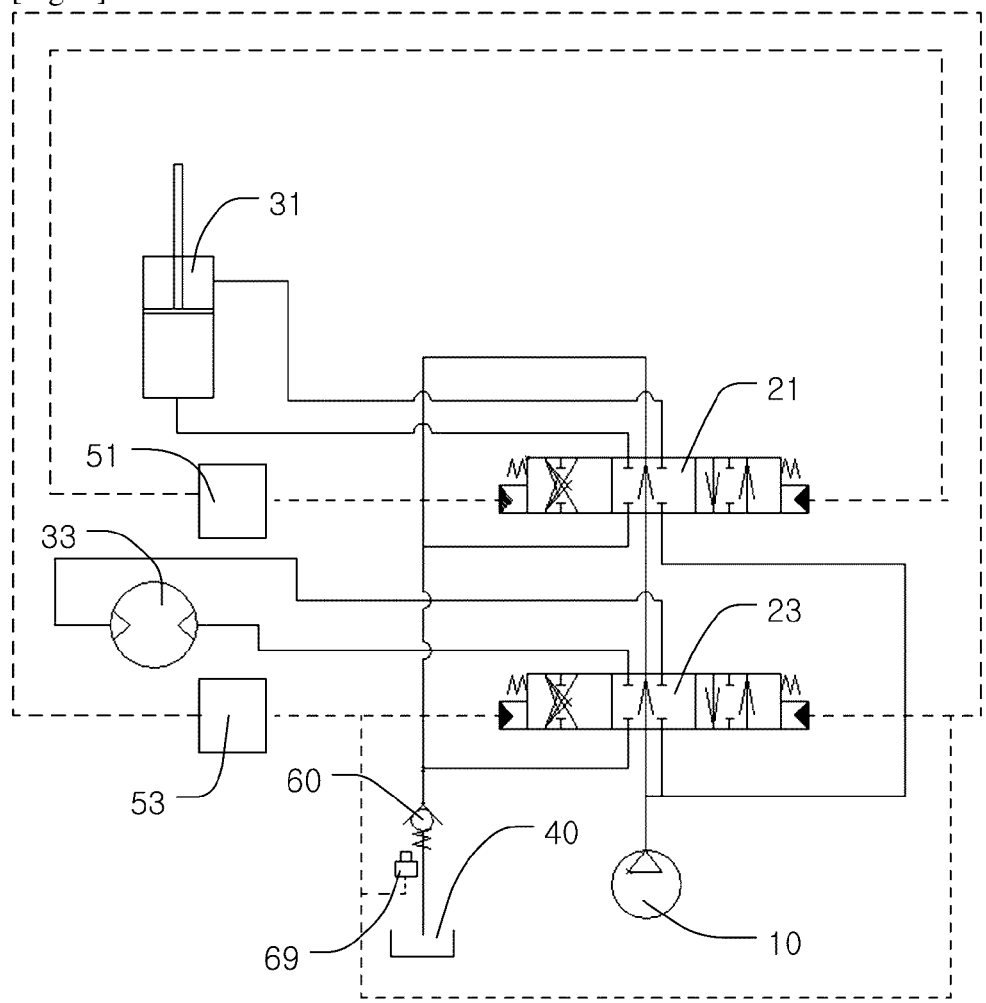

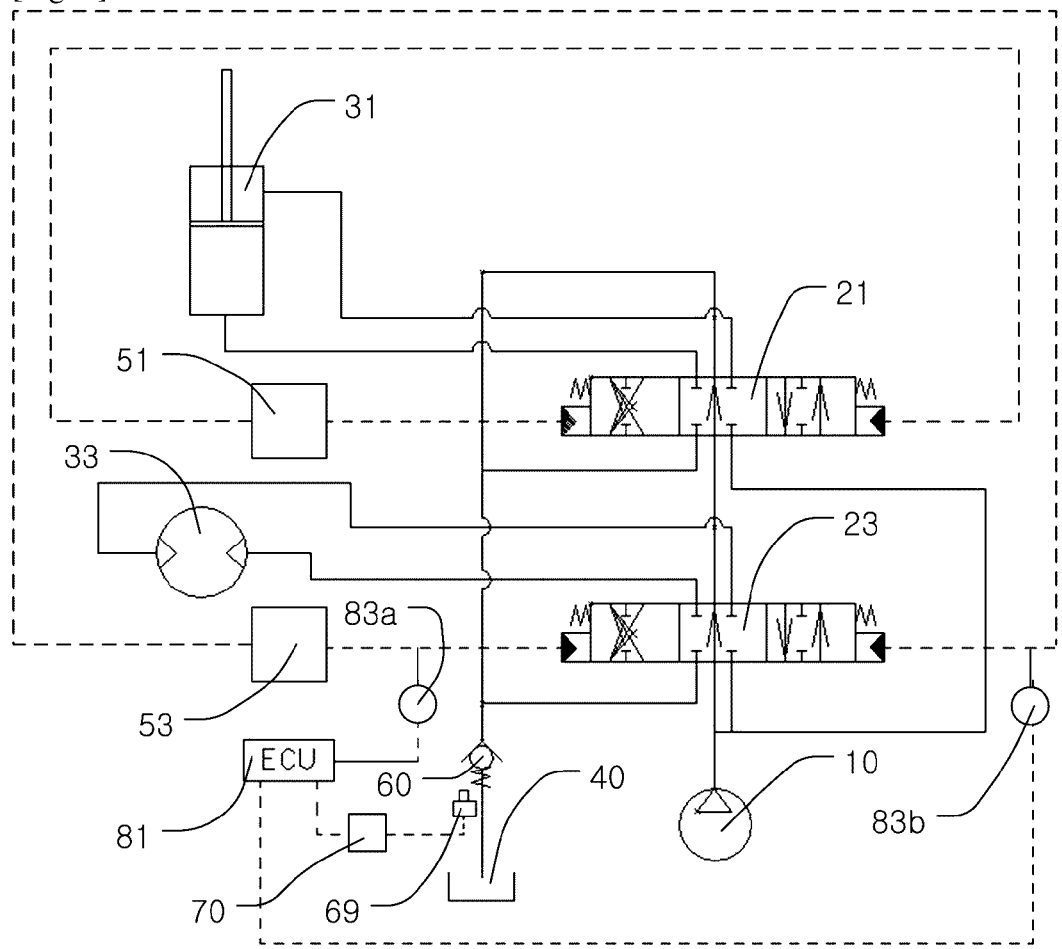
[Fig. 2]

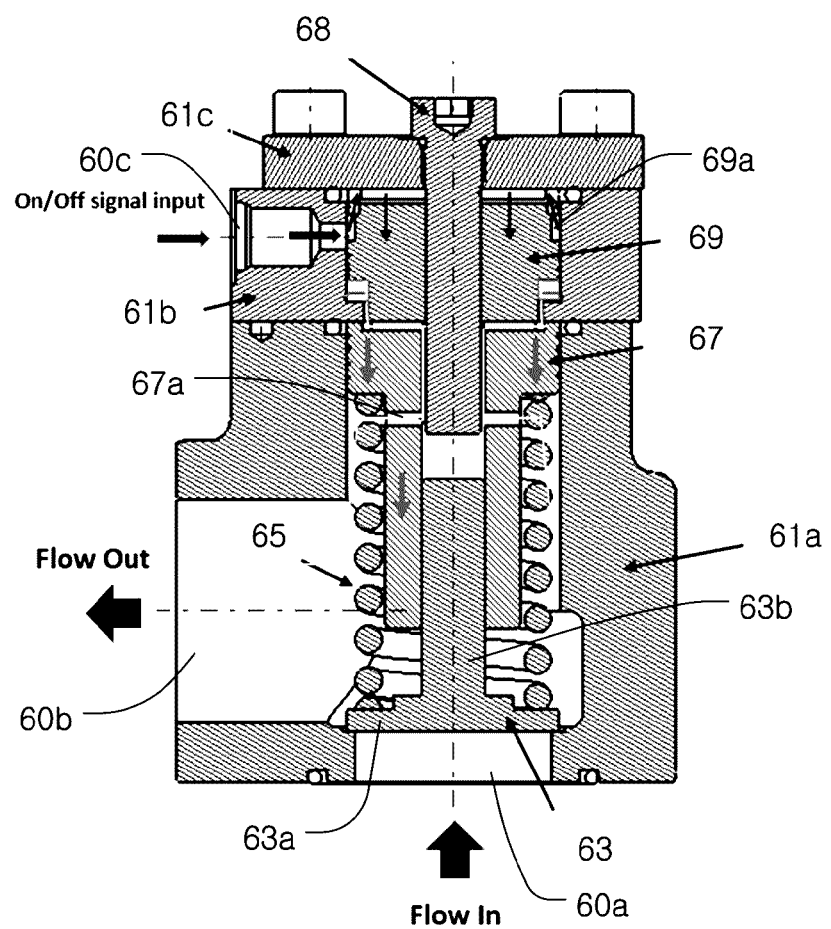
[Fig. 3]

HYDRAULIC MACHINE

CROSS REFERENCE TO RELATED APPLICATIONS

This application is a 35 U.S.C. § 371 national stage application of PCT International Application No. PCT/KR2020/006675 filed on May 22, 2020, the disclosure and content of which is incorporated by reference herein in its entirety.

TECHNICAL FIELD

The present disclosure relates to a hydraulic machine provided with an adjustable return check valve on a return line between a direction control valve and a tank to improve fuel efficiency.

BACKGROUND ART

A variety of hydraulic machines obtaining power from high-pressure fluid and working using the power are known. For example, such machines may supply high-pressure fluid to actuators, which may in turn work using the pressure of the high-pressure fluid. Construction machines, such as excavators, are examples thereof.

Some hydraulic machines are provided with a return check valve on a return line, through which working fluid returns to a tank, with the return check valve providing a predetermined level of back pressure to realize a makeup function in order to prevent cavitation. Since such a return check valve forms a predetermined level of back pressure, the return check valve has an effect on the fuel efficiency of a hydraulic machine.

DISCLOSURE OF INVENTION

Technical Problem

Various aspects of the present disclosure provide a hydraulic machine providing excellent fuel efficiency.

Solution to Problem

According to an aspect, a hydraulic machine may include: an actuator, the actuator including a first actuator and a second actuator; a tank; a directional control valve disposed between the actuator and the tank; and an adjustable return check valve disposed between the directional control valve and the tank, the adjustable return check valve adjusted to provide a low back pressure when the first actuator operates and a high back pressure when the second actuator operates.

According to some embodiments, the adjustable return check valve may provide the high back pressure when a pilot pressure is applied thereto.

According to some embodiments, the hydraulic machine may further include an operator input device movable to indicate a desired movement of the second actuator, and the adjustable return check valve may be adjusted to provide the high back pressure when the operator input device is moved.

According to some embodiments, the adjustable return check valve may include: an inlet port open in a first direction; an outlet port open in a second direction intersecting the first direction; and a pilot port open in the second direction.

According to some embodiments, the adjustable return check valve may include: a valve block having a path defined therein; a poppet opening or closing the path; a guide configured to apply force to the poppet via a spring in a direction of closing the path; and a piston. When the piston pushes the guide toward the poppet, the guide applies a greater amount of force to the poppet, so that the adjustable return check valve provides the high back pressure.

According to some embodiments, a passage allowing pilot fluid to flow therethrough may be provided between an outer circumferential surface of the piston and the valve block, such that a pilot pressure applied to the adjustable return check valve is applied to the piston through the passage.

According to some embodiments, the guide may be provided with a passage through which fluid is discharged from a space between the piston and the guide to the path.

According to some embodiments, the hydraulic machine may further include a stroke limiter provided to limit the stroke of the poppet, wherein a through-hole is defined in each of the piston and the guide, the poppet includes a plug opening or closing the path and a stem movable with respect to the guide while being inserted into the through-hole of the guide, and the stroke limiter limits a range of movement of the stem while being inserted into the through-hole of the piston.

According to some embodiments, the directional control valve may include a first actuator directional control valve disposed between the first actuator and the tank and a second actuator directional control valve disposed between the second actuator and the tank. The adjustable return check valve may allow fluid to flow from the first actuator directional control valve toward the tank while applying the low back pressure but block a flow from the tank toward the first actuator directional control valve. In addition, the adjustable return check valve may allow fluid to flow from the second actuator directional control valve toward the tank while applying the high back pressure but blocks a flow from the tank toward the second actuator directional control valve.

According to some embodiments, the first actuator may be an attachment actuator actuating an attachment, and the second actuator may be a swing actuator.

Advantageous Effects of Invention

As set forth above, the present disclosure may provide a hydraulic machine providing excellent fuel efficiency.

The methods and apparatuses of the present disclosure have other features and advantages that will be apparent from or that are set forth in greater detail in the accompanying drawings, the disclosures of which are incorporated herein, and in the following Detailed Description, which together serve to explain certain principles of the present disclosure.

BRIEF DESCRIPTION OF DRAWINGS

FIG. 1 is a schematic diagram illustrating a hydraulic circuit of a hydraulic machine according to some embodiments of the present disclosure;

FIG. 2 is a schematic diagram illustrating a hydraulic circuit of a hydraulic machine according to some embodiments of the present disclosure; and FIG. 3 is a schematic diagram illustrating a structure of an adjustable return check valve according to some embodiments of the present disclosure.

MODE FOR THE INVENTION

Hereinafter, embodiments of the present disclosure will be described in detail with reference to the accompanying drawings.

A hydraulic machine may work by operating a working device using hydraulic pressure. According to some embodiments, the hydraulic machine may be an excavator. However, the hydraulic machine of the present disclosure is not limited to the excavator, and may include a variety of hydraulic machines obtaining power from hydraulic fluid and working using the power.

According to some embodiments, a return check valve may be mounted on a return line, through which working fluid returns to a tank. Here, the adjustable return check valve may provide a high back pressure only in a swing operation that has a high possibility of cavitation while forming a low back pressure in a typical excavation operation. This may be advantageous in terms of fuel efficiency.

FIG. 1 is a schematic diagram illustrating a hydraulic circuit of a hydraulic machine according to some embodiments of the present disclosure.

According to some embodiments, the hydraulic machine may include directional control valves 21 and 23, actuators 31 and 33, a tank 40, and an adjustable return check valve 60. According to some embodiments, the hydraulic machine may further include operator input devices 51 and 53. According to some embodiments, the hydraulic machine may further include a working fluid source 10, such as a pump.

The actuators may include an attachment actuator 31 and a swing actuator 33. According to some embodiments, the actuators may further include a travel actuator (not shown).

According to some embodiments, the attachment actuator 31 may be a hydraulic cylinder actuating an attachment, such as a boom, an arm, or a bucket. According to some embodiments, the swing actuator 33 may be a hydraulic motor rotating an upper swing body disposed above a lower travel body.

The directional control valves may be disposed between the actuators and the tank 40. The directional control valves may control the directions of flows of working fluid. The directional control valves may include an attachment actuator directional control valve 21 disposed between the attachment actuator 31 and the tank 40 (and between the working fluid source 10 and the attachment actuator 31). The attachment actuator directional control valve 21 may control the direction of a flow of working fluid supplied to the attachment actuator 31. For example, attachment actuator directional control valve 21 may allow an operation for boom-down or boom-up (boom actuator directional control valve), an operation for arm-out or arm-in (arm actuator directional control valve), and an operation for bucket-roll-out or bucket-roll-in (bucket actuator directional control valve) to be selectively performed.

The directional control valves may include a swing actuator directional control valve 23 disposed between the swing actuator 33 and the tank 40 (and between the working fluid source 10 and the swing actuator 33). The swing actuator directional control valve 23 may control the direction of a flow of working fluid supplied to the swing actuator 33. For example, an operation of swinging to the left or the right may be selectively performed.

According to some embodiments, the attachment actuator directional control valve 21 and the swing actuator directional control valve 23 may be integrated into a single block, thereby providing a main control valve.

The adjustable return check valve 60 may be disposed between the directional control valves and the tank 40. The adjustable return check valve 60 may be adjusted to provide a low back pressure when the attachment actuator 31 operates and a high back pressure when the swing actuator 33 operates. The adjustable return check valve 60 may allow fluid to flow from the attachment actuator directional control valve 21 toward the tank 40 while applying a low back pressure but may block a flow of fluid in the opposite direction. In addition, the adjustable return check valve 60 may allow fluid to flow from the swing actuator directional control valve 23 toward the tank 40 while applying a high back pressure but may block a flow of fluid in the opposite direction. It may be possible to selectively adjust the back pressure by controlling a cracking pressure at which a poppet 63 of the adjustable return check valve 60 opens, using a pilot signal applied externally. According to some embodiments, the adjustable return check valve 60 may provide a high back pressure when a pilot pressure is applied thereto.

The (swing actuator) operator input device may be manipulated by an operator to indicate a desired movement of the (swing) actuator. According to some embodiments, the operator input device may be a lever. The operator input device may include an attachment actuator operator input device 51 allowing the operator to control the attachment actuator 31. In addition, the operator input device may include a swing actuator operator input device 53 allowing the operator to control the swing actuator 33. According to some embodiments, the adjustable return check valve 60 may be adjusted to provide the high back pressure when the swing actuator operator input device is operated.

According to some embodiments, as illustrated in FIG. 1, when the swing actuator operator input device 53 is manipulated, the pilot pressure is applied to the swing actuator directional control valve 23 to control the swing actuator directional control valve 23. When the pilot pressure is applied to the left of the swing actuator directional control valve 23 from the view of FIG. 1, (the spool of) the swing actuator directional control valve 23 may move to the right. When the pilot pressure is applied to the right of swing actuator directional control valve 23, (the spool of) the swing actuator directional control valve 23 may move to the left. According to some embodiments, as illustrated in FIG. 1, in response to the swing actuator operator input device 53 being manipulated, the pilot pressure applied to the swing actuator directional control valve 23 may also be applied to a piston 69 of the adjustable return check valve 60, so that the adjustable return check valve 60 provides a high back pressure. In contrast, even when the attachment actuator operator input device 51 is manipulated, the pilot pressure applied to move the attachment actuator directional control valve 21 to a non-neutral position is not applied to the piston 69 of the adjustable return check valve 60, so that the adjustable return check valve 60 maintains a state in which a low back pressure is provided, rather than providing a high back pressure. Accordingly, the cracking pressure may be reduced in operations other than the swing operation, thereby improving fuel efficiency.

According to some other embodiments, an auxiliary valve (not shown) may be provided. In response to the swing actuator operator input device 53 being manipulated, the pilot pressure applied to the swing actuator directional control valve 23 may be applied to the auxiliary valve to open the auxiliary valve. A pilot line (not shown) is connected to the auxiliary valve, and when the auxiliary valve is opened, a pilot pressure may be applied to the piston 69 of the adjustable return check valve 60 through the pilot line, so that the adjustable return check valve 60 may provide a high back pressure.

FIG. 2 is a schematic diagram illustrating a hydraulic circuit of a hydraulic machine according to some embodiments of the present disclosure.

FIG. 2 is a modified embodiment of the embodiment illustrated in FIG. 1. According to some embodiments, as illustrated in FIG. 2, the hydraulic machine may include sensors 83a and 83b sensing the pilot pressure applied to the swing actuator directional control valve 23. A value of the pilot pressure detected by the sensors 83a and 83b is transmitted to a controller 81 as an electric signal. When the swing actuator 33 is determined to be operating on the basis of the pilot pressure value received from the sensors 83a and 83b, the controller 81 transmits an electric signal to an auxiliary valve 70, the electric signal instructing the auxiliary valve 70 to be opened. According to some embodiments, the auxiliary valve 70 may be a solenoid valve. A pilot line (not shown) is connected to the auxiliary valve 70. When the auxiliary valve 70 is opened, a pilot pressure may be applied to the piston 69 of the adjustable return check valve 60 through the pilot line, so that the adjustable return check valve 60 may provide a high back pressure.

Although the hydraulic operator input device is illustrated in FIGS. 1 and 2, the operator input device according to the present disclosure is not limited thereto. The operator input device may be an electric input device.

FIG. 3 is a schematic diagram illustrating a structure of an adjustable return check valve 60 according to some embodiments of the present disclosure.

According to some embodiments, the adjustable return check valve 60 may include a valve block 61a, 61b, and 61c, a poppet 63, a guide 67, and a piston 69.

Flow paths may be formed inside the valve block. According to some embodiments, the adjustable return check valve 60 may include an inlet port 60a, an outlet port 60b, and a pilot port 60c. The inlet port 60a may be open in a first direction. The outlet port 60b may be open in a second direction intersecting the first direction. The pilot port 60c may be open in the second direction. Since the pilot port 60c is open in the second direction, a pilot line may be connected to a side. In this manner, spatial constraints on the rear area of the main control valve may be advantageously removed or reduced. (Differently from the embodiment illustrated in FIG. 3, in an embodiment in which the pilot port 60c is open upward from the view of FIG. 3, the pilot line protrudes rearwardly from the main control valve.)

According to some embodiments, as illustrated in FIG. 3, the valve block may include a main block 61a, a sub-block 61b, and a plate 61c. The poppet 63 may move to open or close the path of the adjustable return check valve 60. When the path is opened, working fluid from the directional control valve may return to the tank 40 through the path inside the valve block. The guide 67 may apply force to the poppet 63 via a spring 65 in a direction of closing the path. When the piston 69 pushes the guide 67 toward the poppet 63, the guide 67 applies a greater amount of force to the poppet 63, so that the adjustable return check valve 60 provides a high back pressure.

According to some embodiments, the adjustable return check valve 60 may include a stroke limiter 68 limiting the stroke of the poppet 63. A through-hole may be formed in each of the piston 69 and the guide 67. The poppet 63 may include a plug 63a opening or closing the path and a stem 63b movable with respect to the guide 67 while being inserted into the through-hole of the guide 67. The stroke limiter 68 may limit the range of movement of the stem 63b while being inserted into the through-hole of the piston 69. Accordingly, irrespective of a level of the back pressure, the maximum opening stroke of the poppet 63 may be uniformly maintained. When the spring 65 is excessively compressed, the durability thereof may be adversely affected. According to the present disclosure, the stroke limiter 68 provided as above may prevent such a problem.

According to some embodiments, a passage 69a allowing pilot fluid to flow therethrough is provided between the outer circumferential surface of the piston 69 and the valve block. When the pilot pressure is applied to the adjustable return check valve 60, the pilot pressure may be applied to the piston 69 through the passage 69a. Referring to FIG. 3, the pilot fluid provided through the pilot port 60c may pass through the passage 69a on the side surface of the piston 69 and then, act on the top portion of the piston 69, thereby increasing the back pressure.

According to some embodiments, the guide 67 may be provided with a passage 67a through which fluid is discharged from a space between the piston 69 and the guide 67 to the path. Referring to FIG. 3, the fluid that has remained in the space between the piston 69 and the guide 67 exits the space through the passage 67a defined in the guide 67 and then, returns to the tank 40, thereby allowing the piston 69 to move up and down. The passage 67a as described above may provide a structural advantage over a separate drain line.

The working fluid returning from the actuator passes through the inside of the main control valve and finally through the adjustable return check valve 60 before returning to the tank 40. In a typical excavation mode, a low back pressure is provided, and the working fluid returns to the tank 40 while maintaining the low-pressure state. However, when a swing operation is performed, the pilot pressure is provided through the pilot port 60c, so that the piston 69 is moved downwardly from the view of FIG. 3. Consequently, the guide 67 is moved downwardly, thereby compressing the spring 65. Here, the cracking pressure of the adjustable return check valve 60 changes from the low pressure to the high pressure.

The foregoing descriptions of specific exemplary embodiments of the present disclosure have been presented with respect to the drawings and are not intended to be exhaustive or to limit the present disclosure to the precise forms disclosed herein, and many modifications and variations would obviously be possible for a person having ordinary skill in the art in light of the above teachings.

It is intended, therefore, that the scope of the present disclosure not be limited to the foregoing embodiments, but be defined by the Claims appended hereto and their equivalents.

The invention claimed is:

1. A hydraulic machine comprising:
   at least one actuator, the at least one actuator comprising a first actuator and a second actuator;
   a tank;
   a directional control valve disposed between the at least one actuator and the tank; and
   an adjustable return check valve disposed between the directional control valve and the tank, the adjustable return check valve adjusted to provide a low back pressure when the first actuator operates and a high back pressure when the second actuator operates, wherein the adjustable return check valve comprises:
   a valve block having a path defined therein;
   a poppet opening or closing the path;
   a guide configured to apply force to the poppet via a spring in a direction of closing the path; and a piston, wherein when the piston pushes the guide toward the poppet, the guide applies a greater amount of force to the poppet, so that the adjustable return check valve provides the high back pressure.

2. The hydraulic machine of claim 1, wherein the adjustable return check valve provides the high back pressure when a pilot pressure is applied thereto.

3. The hydraulic machine of claim 2, wherein the hydraulic machine further comprises an operator input device movable to indicate a desired movement of the second actuator, and
the adjustable return check valve is adjusted to provide the high back pressure when the operator input device is moved.

4. The hydraulic machine of claim 1, wherein the adjustable return check valve comprises:
an inlet port open in a first direction;
an outlet port open in a second direction intersecting the first direction; and
a pilot port open in the second direction.

5. The hydraulic machine of claim 1, wherein a passage allowing pilot fluid to flow therethrough is provided between an outer circumferential surface of the piston and the valve block, such that a pilot pressure applied to the adjustable return check valve is applied to the piston through the passage.

6. The hydraulic machine of claim 1, wherein the guide is provided with a passage through which fluid is discharged from a space between the piston and the guide to the path.

7. The hydraulic machine of claim 1, further comprising a stroke limiter provided to limit the stroke of the poppet,
wherein a through-hole is defined in each of the piston and the guide,
the poppet comprises a plug opening or closing the path and a stem movable with respect to the guide while being inserted into the through-hole of the guide, and
the stroke limiter limits a range of movement of the stem while being inserted into the through-hole of the piston.

8. The hydraulic machine of claim 1, wherein the directional control valve comprises a first actuator directional control valve disposed between the first actuator and the tank and a second actuator directional control valve disposed between the second actuator and the tank, and
the adjustable return check valve allows fluid to flow from the first actuator directional control valve toward the tank while applying the low back pressure but blocks a flow from the tank toward the first actuator directional control valve, and allows fluid to flow from the second actuator directional control valve toward the tank while applying the high back pressure but blocks a flow from the tank toward the second actuator directional control valve.

9. The hydraulic machine of claim 1, wherein the first actuator is an attachment actuator actuating an attachment, and
the second actuator is a swing actuator.

\* \* \* \* \*